E. Evans,
Plow Clevis.
No. 90,736.　　　　Patented June 1, 1869.
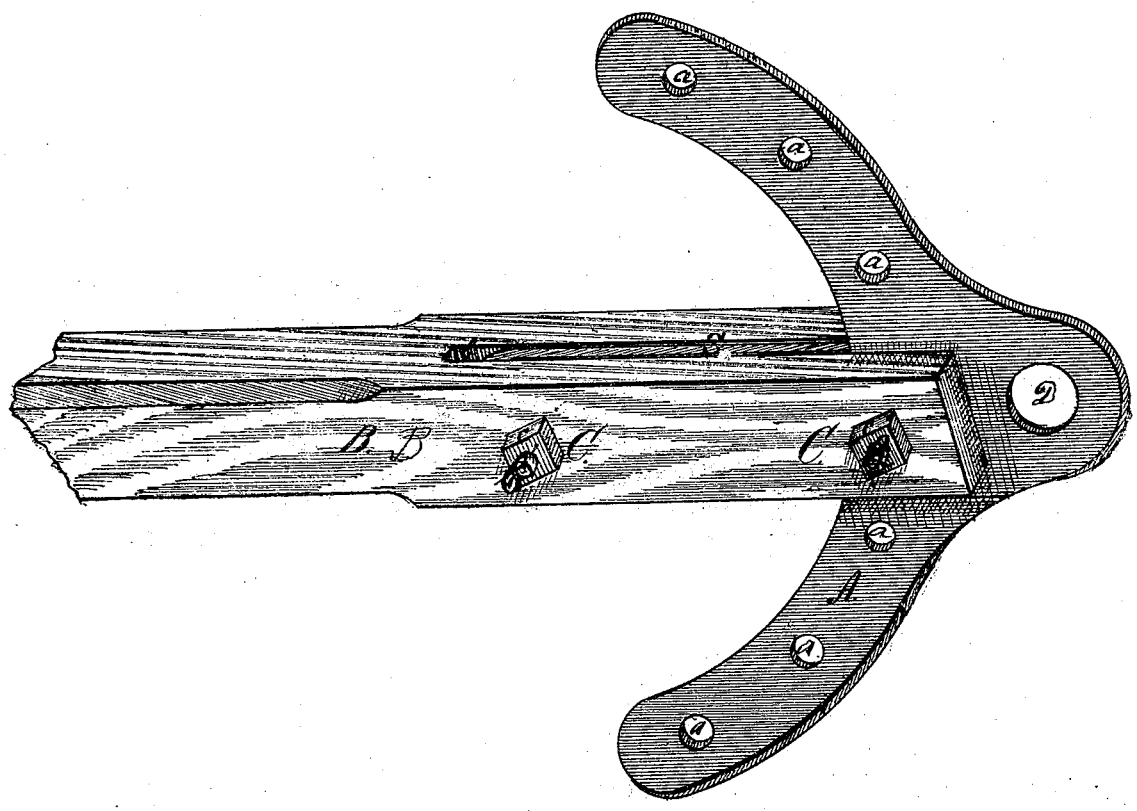
Witnesses:
C. A. Pettit
S. C. Kenon
Elias Evans
by Munn & Co
Attorneys

United States Patent Office.

ELIAS EVANS, OF MONTGOMERY, ALABAMA.

Letters Patent No. 90,736, dated June 1, 1869.

IMPROVEMENT IN CLEVIS.

The Schedule referred to in these Letters Patent and making part of the same.

*To all whom it may concern:*

Be it known that I, ELIAS EVANS, of the city and county of Montgomery, and State of Alabama, have invented a new and improved Regulating-Clevis; and I do hereby declare that the following is a full, clear, and exact description of the construction and operation of the same, reference being had to the accompanying drawings, making a part of this specification, in which my invention is represented by a perspective view.

The object of this invention is to provide, for public use, a clevis, of novel form and construction, which can be easily adjusted, so as to make the plow cut a furrow of any desired depth, and which will be light, strong, and durable.

In the drawings—

B represents the plow-beam, having a vertical open slot or gain, $b$, at its forward end, in which the clevis A is confined by means of a shank, S, projecting into the gain, and a couple of bolts, C C', one extending transversely through the shank, and the other through the body of the clevis, both being held in place by screw-nuts $c$.

The clevis is made from a flat plate of iron, of suitable size and strength, cut into a shape resembling an anchor, its shank, by which it is attached to the plow-beam, corresponding to the shank, and its curved body A corresponding to the arms of the anchor.

The body of the clevis is in the form of an arc of a circle, of which the centre is at C'; and the whole clevis swings on the bolt C' as a pivot, and is adjusted, so as to make the plow run to greater or less depth, by inserting the other bolt, C, through the different holes $a\ a\ a$.

The chain-hook is always connected to the clevis at the large hole D, in line with the shank.

It is evident, that, by means of this simple device, the plow can be readily adjusted to run at any required depth.

The arms, curving backward, will not interfere with the progress of the plow, by catching in the sod, but will rather act like the wheel that is commonly employed, keeping the end of the plow-beam at the precise distance from the ground that it ought to run, according as the furrow is to be deep or shallow.

The whole device is simple and inexpensive.

Having thus described my invention,

What I claim as new, and desire to secure by Letters Patent, is—

The clevis herein described, consisting of the shank S and curved body A, having the holes $a\ a$, D, together with the bolts C C' and nuts $c$, when adapted to be employed in connection with a plow-beam having the gain $b$, substantially as and for the purposes set forth.

To the above specification of my improvement I have set my hand, this 15th day of March, 1869.

ELIAS EVANS.

Witnesses:
WM. S. THORINGTON,
JAS. H. CARKEET.